(12) United States Patent
Schell et al.

(10) Patent No.: US 6,964,816 B2
(45) Date of Patent: Nov. 15, 2005

(54) PACKAGING FILMS CONTAINING COEXTRUDED POLYESTER AND NYLON LAYERS

(75) Inventors: Thomas Andrew Schell, Oshkosh, WI (US); Gregory Robert Pockat, Ripon, WI (US); Andrew John Lischefski, Oshkosh, WI (US)

(73) Assignee: Curwood, Inc., Oshkosh, WI (US)

( * ) Notice: Subject to any disclaimer, the term of this patent is extended or adjusted under 35 U.S.C. 154(b) by 87 days.

(21) Appl. No.: 10/237,949

(22) Filed: Sep. 9, 2002

(65) Prior Publication Data

US 2004/0048080 A1 Mar. 11, 2004

(51) Int. Cl.[7] .......................... B32B 27/00; B32B 27/08; B32B 27/30; B32B 27/34; B32B 27/36
(52) U.S. Cl. .................. 428/474.4; 428/411.1; 428/475.5; 428/475.8; 428/476.3; 428/500; 264/176.1; 264/173.11; 264/173.12; 264/173.16; 264/171.26; 264/241; 264/299
(58) Field of Search .................. 428/474.4, 411.1, 428/475.5, 475.8, 476.3, 500; 264/176.1, 171.27, 241, 171.26, 299, 173.12, 173.16, 173.11

(56) References Cited

U.S. PATENT DOCUMENTS

| | | |
|---|---|---|
| 4,284,674 A | 8/1981 | Sheptak |
| 4,302,511 A | 11/1981 | Tuller et al. |
| 4,361,628 A | 11/1982 | Krueger et al. |
| 4,654,240 A | 3/1987 | Johnston |
| 4,735,855 A * | 4/1988 | Wofford et al. ............. 428/349 |
| 4,746,562 A | 5/1988 | Fant |
| 4,755,419 A | 7/1988 | Shah |
| 4,765,999 A | 8/1988 | Winter |
| 4,855,178 A | 8/1989 | Langley |
| 5,055,355 A | 10/1991 | DeAntonis et al. |
| 5,336,549 A | 8/1994 | Nishimoto et al. |
| 5,482,770 A | 1/1996 | Bekele |
| 5,637,366 A | 6/1997 | Davis et al. |
| 5,716,715 A * | 2/1998 | Degrassi et al. ......... 428/475.8 |
| 5,863,643 A | 1/1999 | von Widdern et al. |
| 5,895,694 A | 4/1999 | Zavadsky et al. |
| 5,928,740 A | 7/1999 | Wilhoit et al. |
| 5,972,447 A | 10/1999 | Hata et al. |
| 6,083,587 A | 7/2000 | Smith et al. |
| 6,214,476 B1 | 4/2001 | Ikeda et al. |
| 6,221,410 B1 | 4/2001 | Ramesh et al. |
| 6,239,210 B1 | 5/2001 | Kim et al. |
| 6,258,423 B1 | 7/2001 | Giori |
| 6,274,228 B1 | 8/2001 | Ramesh et al. |
| 6,288,161 B1 | 9/2001 | Kim et al. |
| 6,291,041 B1 * | 9/2001 | Howells et al. ............ 428/35.4 |
| 6,333,061 B1 | 12/2001 | Vadhar |
| 6,337,113 B1 | 1/2002 | Muggli et al. |
| 6,355,358 B1 | 3/2002 | Boer et al. |
| 6,361,843 B1 | 3/2002 | Smith et al. |
| 6,379,812 B1 | 4/2002 | Hofmeister et al. |
| 6,410,156 B1 | 6/2002 | Akkapeddi et al. |
| 6,479,160 B1 * | 11/2002 | Tsai et al. ................. 428/474.4 |
| 6,521,168 B1 * | 2/2003 | Gini ........................... 264/514 |
| 6,667,101 B2 * | 12/2003 | Silagy et al. ............. 428/411.1 |
| 6,706,413 B2 * | 3/2004 | Bohringer et al. ........ 428/474.4 |
| 2001/0051256 A1 | 12/2001 | Silagy et al. |

FOREIGN PATENT DOCUMENTS

| | | |
|---|---|---|
| EP | 0 476 836 B1 | 11/1995 |
| EP | 1 142 704 A1 | 10/2001 |
| EP | 1 207 042 A1 | 5/2002 |
| JP | 7096582 A | 10/1995 |
| JP | 10034852 A | 10/1998 |
| WO | WO 98/37141 | 8/1998 |

OTHER PUBLICATIONS

Derwent Publications Ltd., London, GB; Section Ch. Week 199816; AN 1998–173601 XP002262961 & JP 10 034852 A (Mitsubishi Plastics Ind Ltd), (Feb. 10, 1998)—abstract.
Derwent Publications Ltd., London, GB; Section Ch. Week 199530; AN 1995–227254 XP002262962 & JP 07 096582 A (Mitsubishi Plastics Ind Ltd), (Apr. 11, 1995)—abstract.

* cited by examiner

Primary Examiner—P. Hampton Hightower
(74) Attorney, Agent, or Firm—Tom J. Hall (57) ABSTRACT

Multilayer thermoformable structures for packaging film applications. The multilayer structures having at least a first layer of polyester, a second layer of a first adhesive and a third layer of a nylon blend formed into a flexible non-oriented film by coextrusion.

85 Claims, 4 Drawing Sheets

PACKAGING FILMS CONTAINING COEXTRUDED POLYESTER AND NYLON LAYERS

BACKGROUND OF THE INVENTION

The present invention relates to multilayer thermoformable structures for packaging film applications. Particularly, the invention relates to polyester and nylon structures formed into packaging films.

Multilayer thermoforming structures formed into flexible films are used to package food and medicinal articles, to protect the articles against external contamination and abuse, and to provide an attractive package for the article for its eventual sale.

There is great commercial interest in the packaging industry for a film structure, which provides superior mechanical strength, better optical and gas barrier properties, and improved thermoformability.

SUMMARY OF THE INVENTION

The present invention is directed to a multilayer thermoformable structure comprising a first layer of polyester; a second layer of an adhesive; a third nylon layer preferably consisting essentially of a nylon blend wherein the blend contains no more than about 25% (wt.) of amorphous nylon; and where the first layer, the second layer and the third layer are formed into a flexible film by a coextrusion process. Films which combine different layers into a single structure may be made by slot cast coextrusion or single-bubble blown coextrusion. The flat die or slot cast process includes extruding a polymer material through a die on to a chilled roll and winding the film onto a roll for further processing. In the single-bubble blown coextrusion process, polymer material is forced through a die and around a mandrel, and then emerges in tubular form. The tube or bubble is expanded by blowing air through the center of the mandrel to a desired thickness and, then rapidly cooled or quenched. Films made by either the slot cast or single-bubble blown method, as described hereinabove, are nonoriented as opposed to manufacturing methods which induce high levels of orientation in films such as the double-bubble or the tenter frame process.

Optionally the first and third layers directly contact opposing sides of the second layer.

In one embodiment, the first, second and third layered structure is used to form a flexible seven-layered film.

Suitable films of the present invention may be characterized as being nonoriented and/or as having a percent elongation at break at room temperature greater than about 250 in either or both the machine (MD) direction and the transverse direction (TD), and/or as having a heat shrinkage value less than about 5% at 90° C. (MD and TD).

DETAILED DESCRIPTION OF THE INVENTION

Figure 1:
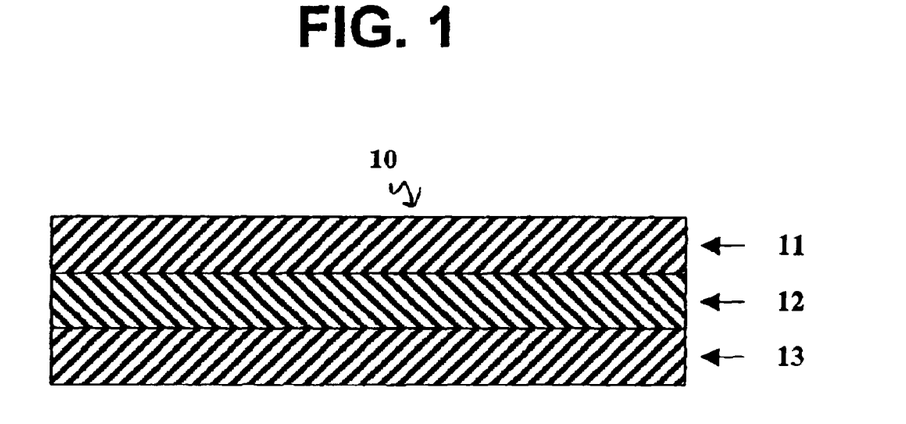
FIG. 1 is a cross-sectional view of a multilayer structure having three layers according to the present invention.

With reference to the drawings, there is seen in FIG. 1 a three-layer multilayer structure 10 having a first layer 11, a second layer 12, and a third layer 13 formed into a film by coextrusion. First layer 11 of multilayer structure 10 comprises a polyester; a second layer 12 of an adhesive; and a third layer 13 comprising nylon or optionally a nylon blend wherein the third layer contains no more than 25% (wt.) of amorphous nylon.

Figure 2:
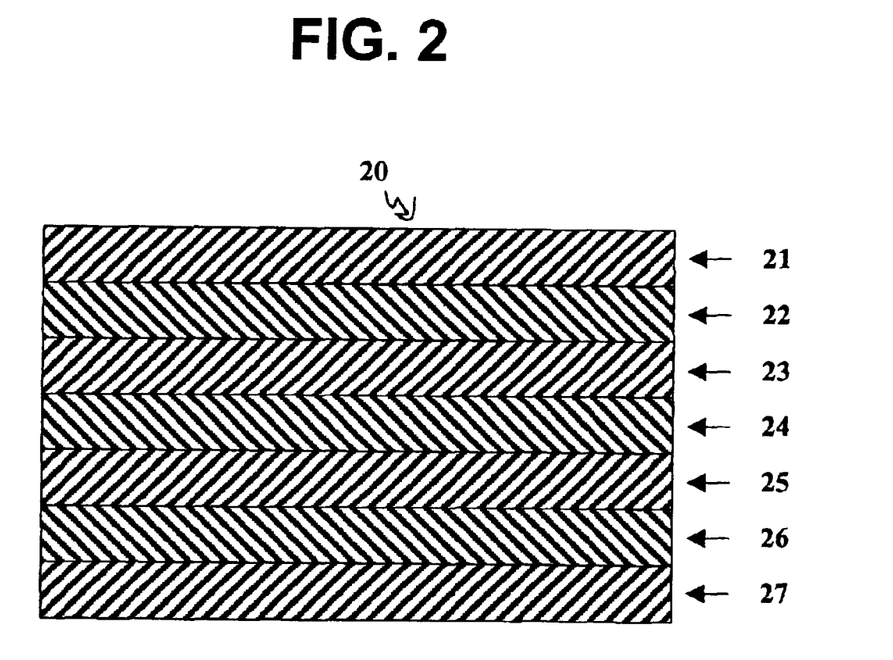
FIG. 2 is a cross-sectional view of a multilayer structure having seven layers according to the present invention.

In FIG. 2, a seven-layer multilayer structure 20 is shown having a first layer 21, a second layer 22, a third layer 23, a fourth layer 24, a fifth layer 25, a sixth layer 26, and a seventh layer 27. Multilayer structure 20 may have a first layer 21 comprising polyester; a second layer 22 and fifth layer 25 each comprising an adhesive; a third layer 23 and fifth layer 25 comprising nylon or optionally a nylon blend wherein the third layer contains no more than 25% (wt.) of amorphous nylon; a fourth layer 24 comprising an oxygen barrier or optionally, an adhesive; and a seventh layer 27 comprising a sealant.

Figure 3:
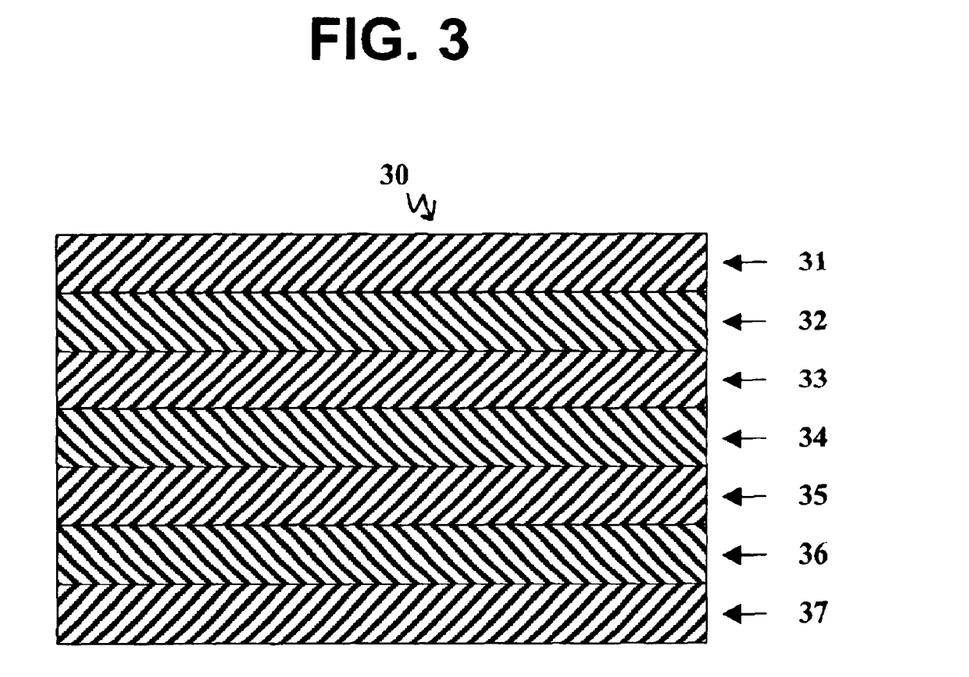
FIG. 3 is a cross-sectional view of a multilayer structure having an alternative seven layers according to the present invention.

In FIG. 3, a seven-layer multilayer structure 30 is shown having a first layer 31, a second layer 32, a third layer 33, a fourth layer 34, a fifth layer 35, a sixth layer 36, and a seventh layer 37. Structure 30 may have a first layer comprising polyester; a second layer 32, a third layer 33 and a sixth layer 36 each comprising an adhesive; a fourth layer 34 comprising nylon or optionally a nylon blend wherein the third layer contains no more than 25% (wt.) of amorphous nylon; a fifth layer 35 comprising an oxygen barrier; and a seventh layer comprising a sealant.

Figure 4:
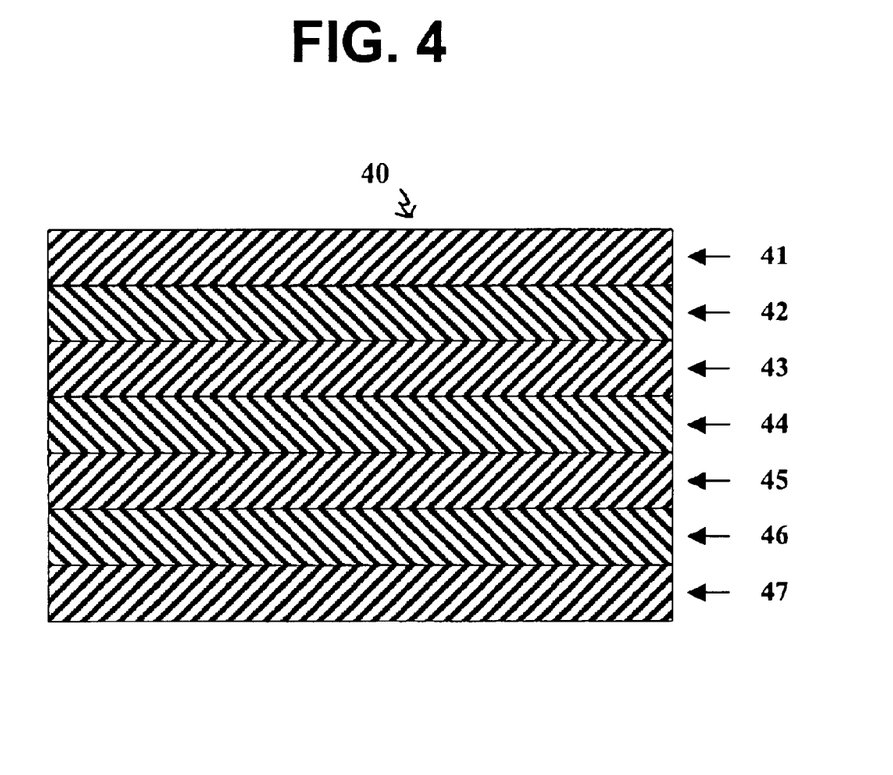
FIG. 4 is a cross-sectional view of a multilayer structure having another alternative seven layers according to the present invention.

In FIG. 4, a seven-layer multilayer structure 40 is shown having a first layer 41, a second layer 42, a third layer 43, a fourth layer 44, a fifth layer 45, a sixth layer 46, and a seventh layer 47. The structure 40 may have a first layer 41 comprising a polyester; a second layer 42, a fourth layer 44, and sixth layer 46 each comprising an adhesive; a third layer 43 comprising a homopolymer or copolymer of a polyolefin; a fifth layer of nylon or optionally a nylon blend wherein the third layer contains no more than 25% (wt.) of amorphous nylon; and a seventh layer 47 comprising a sealant.

As used herein, the term "polyester" refers to a synthetic homopolymers and copolymers having ester linkages between monomer units which may be formed by condensation polymerization methods. Polymers of this type are preferable aromatic polyesters and more preferable, homopolymers and copolymers of poly (ethylene terephthalate), poly (ethylene naphthalate) and blends thereof. Suitable aromatic polyesters may have an intrinsic viscosity between 0.60 to 1.0, preferably between 0.60 to 0.80.

With reference to multilayer structure 10, the first layer 11 provides superior dimensional stability to the film during the thermoforming process and can serve as a surface layer in the film structure. The thickness of the first layer may be greater than or less than less than 5 mils or less than 3 mils and is typically between about 0.25 mils to about 5 mils, preferably between about 0.25 mils to about 3.0 mils. Examples of preferred polyesters are available under the trademarks EASTAPAK® PET Polyester 9663, EASTPAK® Polymer 9921 and EASTAR® Copolyester 6763, all from Eastman Chemical Company, Kingsport, Tenn., U.S.A.

Second layer 12 is an adhesive material e.g. selected from the group consisting of a modified or unmodified homopolymer or copolymer especially ethylene copolymers, alkyl acrylates such as methyl acrylate, ethyl acrylate, n-butyl acrylate, or vinyl esters such as ethylene vinyl acetate, especially ethylene vinyl acetate copolymers, ethylene-alpha olefin (EAO), olefin and blends thereof.

"Olefin" is used herein broadly to include polymers such as polyethylene, ethylene copolymers having a small amount of a copolymer such as vinyl acetate, ethylene-alpha olefin copolymers (LLDPE), polypropylene, polybutene, and other polymeric resins falling in the "olefin" family classification.

As used herein, the term "modified" refers to a chemical derivative e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom.

One of the primary functions served by second layer 12 is as a bonding layer, i.e., to bond first layer 11 with third layer 13. Preferably the first and third layers directly contact opposing sides of the second layer, but optionally one or more additional layers may be coextruded between the first and third layers as long as these intermediate layers in conjunction with the adhesive lamination have sufficient adherence and corresponding delamination resistance for the intended use e.g. as a thermoformable film. The thickness of the second layer is between about 0.15 mils to about 5.0 mils, preferably between about 0.3 mils to about 0.4 mils. Examples of suitable commercially available adhesives are sold by Rohm and Haas, Philadelphia, Pa., U.S.A. under the trademark TYMOR® 72X06; Mitsui Petrochemical Industries, Ltd. of Tokyo, Japan, under the trademark ADMER™ SF700; and DuPont Chemical Company, Wilmington, Del., U.S.A. under the trademark BYNEL® 41E687.

The third layer 13 comprises nylon or nylon blend. Suitable nylons include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof.

Preferably, the third layer comprises between about 100% (wt.) to about 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof; blended with between about 0% (wt.) to about 29% (wt.) of an amorphous nylon.

The generic source-based nomenclature convention is used to name the hereinabove nylon polymers and copolymers. See, "Generic Source-Based Nomenclature For Polymers," Pure Applied Chemistry, Vol. 73, No. 9, pp. 1511–1519 (International Union of Pure and Applied Chemistry 2001).

The third layer typically has a thickness between about 0.5 mils to about 4 mils, and preferably comprises between about 5% to about 20% of the total thickness for the first, second and third layers combined. Examples of commercially available nylons are sold under the trademark ULTRAMID® C35 or ULTRAMID® B36 from BASF, Mount Olive, N.J., U.S.A., and 66 ZYTEL® 42A NC010 from DuPont Chemical Company, Wilmington, Del., U.S.A. A commercial example of an amorphous nylon is sold under the trademark SELAR® PA 3426 from DuPont Chemical Company, Wilmington, Del., U.S.A.

As used herein, the term "amorphous nylon" refers to nylons with an absence of a regular three-dimensional arrangement of molecules or subunits of molecules extending over distances, which are large relative to atomic dimensions. However, regularity of structure exists on a local scale. See, "Amorphous Polymers," Encyclopedia of Polymer Science and Engineering, $2^{nd}$ Ed., pp. 789–842 (J. Wiley & Sons, Inc. 1985). In particular, the term "amorphous polyamide" as used with respect to the present invention refers to a material recognized by one skilled in the art of differential scanning calorimetry (DSC) as having no measurable melting point (less than 0.5 cal,g) or no heat of fusion as measured by DSC using ASTM 3417-83. Such nylons include those amorphous nylons prepared from condensation polymerization reactions of diamines with diacarboxylic acids. For example, an aliphatic diamine is combined with an aromatic dicarboxylic acid, or an aromatic diamine is combined with an aliphatic dicarboxylic acid to give suitable amorphous nylons.

The first, second and third layers are combined into a multilayer film by single-bubble blown or slot cast extrusion. When polymers are extruded into mono or multilayer films using cast methods such as the slot cast method, "gauge bands" tend to form, which are narrow strips of thicker extrudate running continuously in the machine direction. Gauge bands accumulate as the film is wound onto a roll, which accentuates the variations in film thickness and ultimately results in an undesirable film. For this reason, it is preferred that the multilayer structure of the present invention is coextruded into a multilayer film by the single-bubble blown method. As used herein, the term "coextruded" refers to the process of extruding two or more materials through a single die with two or more orifices arranged so that the extrudates merge and weld together into a film structure before chilling and solidifying, e.g., via water, chilled metal, or air quenching. In accordance with the present invention, the preferred film is nonoriented.

Multilayered structure 10 is formed into a flexible film by a coextrusion process; and preferably by a single-bubble blown or slot cast coextrusion process, most preferably by a single-bubble blown film process.

In accordance with the present invention, the multilayered structure 10 with three layers formed into a flexible film has a thickness less than about 16 mils, more preferably less than about 10 mils, and most preferably, from about 3 mils to about 7 mils. In the present invention, the multilayered structure 20 with seven layers formed into a flexible film has a thickness less than about 16 mils, more preferable less than about 10 mils, and most preferably, from about 3 mils to about 7 mils.

Further, the multilayered structure 10 formed into a flexible film has a heat shrinkage value of less than about 5% at 90° C.; preferably less than about 2% at 90° C. Heat shrinkage test is defined to be values obtained by measuring unrestrained shrink at 90° C. for five seconds. Four test specimens are cut to 10 cm. in the machine direction by 10 cm. in the transverse direction. Each specimen is completely immersed for 5 seconds in a 90° C. water bath (or other specified nonreactive liquid). The distance between the ends of the shrunken specimen is measured. The difference in the measured distance for the shrunken specimen and the original 10 cm. is multiplied by ten to obtain the percent of shrinkage for the specimen for each direction. The M.D. shrinkage for the four specimens is averaged for the machine direction shrinkage value of the given film sample, and the T.D. shrinkage for the four specimens is averaged for the transverse direction shrinkage value.

It is also preferred that the multilayered structure 10 formed into a flexible film have a percent elongation at break at room temperature of greater than about 250 in either or both the machine direction and in the transverse direction. The percent elongation at break may be measured by following the procedure as outlined by ASTM D-882, Method A which method is hereby incorporated by reference.

According to the present invention, the multilayered structure 10 may advantageously be formed into a flexible film containing less than 500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

Small amounts of additives such as slip or anti-block agents, pigments, processing aids and the like can be included in any of the layers in the multilayered structure 10 or in any layers further added to this structure which is formed into a flexible film.

One noteworthy characteristic of the flexible films formed from multilayered structure 10 of this invention is they provide superior optical properties, i.e., high gloss. Gloss may be measured using the test method described by ASTM D-2457 at a 45° angle which method is hereby incorporated by reference. According to the present invention, the multilayered structure 10 formed into a film has a gloss value greater than about 65 Hunter Units (HU).

Multilayer structure 10 may be used alone, i.e., as a three-layer film. For certain packaging applications, it may be beneficial to include the three-layer structure 10 as a substructure in a larger multilayer flexible film. In such a configuration, the larger multilayer film incorporating structure 10 as a substructure may advantageously possess properties and benefits resulting from the three-layer structure 10 as discussed above, but may also possess additional properties and benefits arising from the additional layers.

Larger multilayer film structures which incorporate structure 10 as a substructure may have at least one additional layer adhered to structure 10 by various methods known to those skilled in the art which include thermal lamination, adhesive lamination, coextrusion coating, coextrusion lamination.

Slot cast or single-bubble blown coextrusion of structure 10 with additional polymeric layers produces multilayer structure 20. Multilayer structure 20 formed into a flexible film includes a fourth layer 24, which may comprise a gas barrier or a second adhesive.

When the multilayer structure 20 includes a gas barrier as a fourth layer 24, it is preferable that the barrier be an oxygen barrier. Preferred oxygen barriers include ethylene vinyl alcohol copolymer, polyvinylidene chloride copolymers, polyacrylonitrile, acrylonitrile copolymer, and blends thereof. A more preferred oxygen barrier is an ethylene vinyl alcohol copolymer, which is commercially available under the trademark SOARNOL ET3803 obtained from The Nippon Synthetic Chemical Industry Company, Ltd. (Nippon Gohsei), Osaka, Japan.

A noteworthy characteristic of the flexible film formed from multilayered structure 20 where the fourth layer 24 is an oxygen barrier is that the film exhibits excellent barrier properties. Oxygen permeation resistance or barrier may be measured using the procedure of ASTM D-3985 which method is hereby incorporated by reference. Accordingly, the multilayered structure 10 formed into a flexible film where the fourth layer 24 is an oxygen barrier has an oxygen transmission rate less than about 15.5 cc/m$^2$ for 24 hours at 1 atmosphere.

When the multilayer structure 20 includes an adhesive as the fourth layer 24, the function of the fourth layer 24 is to bond layer 23 and layer 25 together. Suitable materials which can be used as an adhesive are selected from a group consisting of a modified or unmodified homopolymer or copolymer of alkyl acrylates such as methyl acrylate, ethyl acrylate, n-butyl acrylate, or vinyl esters such as vinyl acetate, especially ethylene vinyl acetate copolymers (EVA), ethylene-alpha olefin (EAO), olefin and blends thereof. Preferred adhesives are similar to those useful in the second layer and may include anhydride and/or rubber modified EVAs and EAOs.

Multilayer structure 20 formed into a flexible film preferably includes a fifth layer 25 comprises nylon or nylon blend. The fifth layer comprises a nylon selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof.

Preferably, the fifth layer is a blend between about 100% (wt.) to about 71% (wt.) of a nylon selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof; and between about 0% (wt.) to about 29% (wt.) of an amorphous nylon.

Examples of commercially available nylons are sold under the trademark ULTRAMID® C35 and ULTRAMID® B36 from BASF, Mount Olive, N.J., U.S.A., and 66 ZYTEL® 42A NC010 from DuPont Chemical Company, Wilmington, Del., U.S.A. A commercial example of an amorphous nylon is sold under the trademark SELAR® PA 3426 from DuPont Chemical Company, Wilmington, Del., U.S.A.

Multilayer structure 20 formed into a flexible film may further comprise a sixth layer 26 being an adhesive. The sixth layer 26 functions as an adhesive for bonding layer 25 and layer 27 together. Suitable materials as an adhesive are selected from a a group consisting of a modified or unmodified homopolymer or copolymer of alkyl acrylates such as methyl acrylate, ethyl acrylate, n-butyl acrylate, or vinyl esters such as vinyl acetate, especially ethylene vinyl acetate copolymers (EVA), ethylene-alpha olefin (EAO), olefin and blends thereof. Preferred adhesives are similar to those useful in the second layer and may include anhydride and/or rubber modified EVAs and EAOs.

An example of a commercially available material is sold under the trademark BYNEL® 41E687 from DuPont Chemical Company, Wilmington, Del., U.S.A. When layers are being laminated together as part of the structure containing the required coextrusion then the adhesive to adher the laminate of one or more added layers may also be chosen from chemical adhesives such as urethane or isocynate adhesives.

Multilayer structure 20 formed into a flexible film preferably includes a seventh layer 27 comprising a sealant. As used herein, the term "sealant" refers to a layer which is heat sealable to itself, i.e., be capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough.

Examples of suitable materials for the seventh layer 27 in the multilayered structure 20 include a sealant selected from a group consisting of an ionomer, heterogeneous ethylene alpha olefin copolymer, a homogeneous ethylene alpha olefin copolymer, ethylene vinyl acetate copolymer, ethylene methyl acrylate copolymer, ethylene propylene copolymer, polybutylene homopolymer or copolymer, and blends thereof.

The invention will now be further described in the following examples.

EXAMPLES 1 TO 4

It is to be understood, the present invention is not restricted to the following examples within the scope of the invention.

In all the following examples, all film structures were produced using a single-bubble coextrusion apparatus and method. The single-bubble blown film apparatus includes a multi-manifold circular die head for bubble blown film through which the film composition is forced and formed into a cylindrical bubble. The bubble is immediately quenched e.g., via cooled water bath, solid surface and/or air, and then ultimately collapsed and formed into a film.

EXAMPLE 1

For Example 1, the first layer 11 comprises polyester and polyester additives, which are dried prior to being mixed together. The polyester comprises a copolymer of polyester terephthalate having a reported density of about 1.27 g/cm$^3$, an inherent viscosity of 0.70, a 45° gloss of 108 Hunter Units (HU) and is available under the trademark EASTAR Copolyester 6763 from Eastman Chemical Company, Kingsport, Tenn. U.S.A. A second layer 12 is an adhesive resin having a density of 0.941 g/cm$^3$, melt flow index of 5.0 g/10 minutes, a Vicat softening point of 48° C., and is available under the trademark TYMOR® 72X06 from Rohm and Haas Company, Philadelphia, Pa., U.S.A. Third layer 13 is a mixture of nylon 6 having a density of 1.12 g/cm$^3$, a melting point of a 220° C., a recrystallization temperature (as measured by deferential scanning calorimetry (DSC)) of 176° C., being available under the trademark ULTRAMID® B36 from BASF Corporation, Mount Olive, N.J., U.S.A.; and an amorphous nylon having a density of 1.19 g/cm$^3$, a glass transition temperature of 127° C., a heat deflection temperature at 66 psi of 126° C., and is sold under the trademark SELAR® PA 3426 by DuPont Chemical Company, Wilmington, Del., U.S.A.

In Example 1, in accordance with the present invention, a multilayer thermoformable structure is formed into a film by the following procedure:

Each layer is melt plastified in a separate extruder connected to an annular coextrusion die from which the heat plastified layers are coextruded forming a tube or bubble. The bubble has a first layer, a second layer and a third layer. The first and third layers are directly attached to opposing sides of the second core layer.

For each layer, the resin or resin mixture are fed from a hopper into an attached single screw extruder where the resin or resin mixture are heat plastified and extruded through a three layer coextrusion die into a tube or single-bubble. The extruder barrel temperature for the first layer is 500° F. (260° C.) and for the second and third layers is about 520° F. (271° C.). The bubble is maintained at a width of less than 53 inches. The extruded multilayer bubble is quenched against a cooled solid surface. The cooled bubble is flattened by passage through a pair of nip rollers and the resultant film of Example 1 has an average gauge of about 5 mils.

With reference to FIG. 1, a multilayered structure 10 is formed into a film in accordance with the present invention having the following three layers:
Layer 1: 97.5% Poly (ethylene terephthalate)+1.5% antiblock additive+1.0% slip agent (20% of total weight of layers 1–3).
Layer 2: Adhesive (55% of total weight of layers 1–3).
Layer 3: 85% Nylon 6+15% amorphous nylon (25% of total weight of layers 1–3).

EXAMPLES 2–4

For Example 2, first layer 21 comprises a homopolymer of polyester terephthalate having a reported crystalline density of about 1.4 g/cm$^3$, an inherent viscosity of 0.80, a 45° gloss of 108 Hunter Units (HU) and is available under the trademark EASTAPAK Polymer 9921 from Eastman Chemical Company, Kingsport, Tenn., U.S.A.

For Example 3–4, the first layer 21 comprised a polyester terephthalate copolymer and polyester additives, which are dried prior to being mixed together. The polyester terephthalate copolymer had a reported density of about 1.27 g/cm$^3$, an inherent viscosity of 0.70, a 45° gloss of 108 Hunter Units (HU) and was available under the trademark EASTAR Copolyester 6763 from Eastman Chemical Company, Kingsport, Tenn., U.S.A.

For Example 2–4, the second layer 22 and sixth layer 26 were identical adhesive material having a reported density of 0.88 g/cm3, a melt index at 190° C. of 1.0 g/10 min. and was available under the trademark ADMER™ SF700 from Mitsui Petrochemical Industries, Ltd., Tokyo, Japan. Third layer 23 and fifth layer 25 were identical mixtures of nylon 6 having a density of 1.12 g/cm$^3$, a melting point of a 220° C., a recrystallization temperature (as measured by deferential scanning calorimetry (DSC)) of 176° C., being available under the trademark ULTRAMID® B36 from BASF Corporation, Mount Olive, N.J., U.S.A.; and an amorphous nylon having a density of 1.19 g/cm$^3$, a glass transition temperature of 127° C., a heat deflection temperature at 66 psi of 126° C., and is sold under the trademark SELAR® PA 3426 by DuPont Chemical Company, Wilmington, Del., U.S.A.

For Example 2–3, the fourth layer 24 comprised ethylene vinyl alcohol copolymer (EVOH) having a reported bulk density of 0.64–0.74 g/cm$^3$, a relative density of 1.13–1.22 g/cm$^3$, a melting point of 164–188° C., and was available under the trademark SOARNOL® ET3803 from the Nippon Synthetic Chemical Industry Company, Ltd. (Nippon Gohsei), Osaka, Japan.

In Example 4, the fourth layer 24 was an adhesive material having a density of 0.941 g/cm$^3$, melt flow index of 5.0 g/10 minutes, a Vicat softening point of 48° C., and was available under the trademark TYMOR® 72X06 from Rohm and Haas Company, Philadelphia, Pa., U.S.A.

For Examples 2–4, the seventh layer 27 comprises a partial zinc salt of ethylene methacrylic acid copolymers having a density of 0.940 g/cm$^3$, a melt flow index at 190° C. of 1.30 g/10 min., a Vicat softening point of 165° F. (73.9° C.), and was available under the trademark SURLYN® 1601 from DuPont Chemical Company, Wilmington, Del. U.S.A.

In examples 2–4, one extruder was used for each layer. Each extruder was connected to an annular coextrusion die from which heat plastified resins were coextruded forming a tube or single-bubble having seven layers.

The resin or resin mixture was fed from a hopper into an attached single screw extruder where the heat plastified and extruded through a seven-layer coextrusion die into a tube or single-bubble. The extruder barrel temperature for the first layer was about 500° F. (260° C.); for the second layer 510° F. (266° C.); and for the third through seventh layers, about 520° F. (271° C.). The bubble is maintained at a width of less than 53 inches. The extruded multilayer bubble is quenched against a cooled solid surface. The cooled bubble is flattened by passage through a pair of nip rollers and the resultant film of Example 2–4 had an average gauge between 4 mil to 6 mil.

With reference to FIG. 2, a multilayered structure 20 was formed into a film in accordance with the present invention having the following seven layers:

EXAMPLE 2

Layer 21: Poly (ethylene terephthalate) (20% of total weight of layers 1–7).
Layer 22: Adhesive (13% of total weight of layers 1–7).
Layer 23: 85% Nylon 6+15% amorphous nylon (14% of total weight of layers 1–7).
Layer 24: Oxygen barrier (9% of total weight of layers 1–7).
Layer 25: 85% Nylon 6+15% amorphous nylon (14% of total weight of layers 1–7).
Layer 26: Adhesive (12% of total weight of layers 1–7).
Layer 27: Sealant (18% of total weight of layers 1–7).
The film had a total thickness of about 5 mils.

EXAMPLE 3

Layer 21: 98.5% Poly (ethylene terephthalate)+1.0% antiblock additive+0.5% slip agent (25% of total weight of layers 1–7).
Layer 22: Adhesive (11% of total weight of layers 1–7).
Layer 23: 85% Nylon 6+15% amorphous nylon (14% of total weight of layers 1–7).
Layer 24: Oxygen barrier (9% of total weight of layers 1–7).
Layer 25: 85% Polyamide 6+15% amorphous polyamide (14% of total weight of layers 1–7).
Layer 26: Adhesive (10% of total weight of layers 1–7).
Layer 27: Sealant (17% of total weight of layers 1–7).
The film had a total thickness of about 4 mils.

EXAMPLE 4

Layer 21: 97.5% Poly (ethylene terephthalate)+1.5% antiblock additive+1.0% slip agent (15% of total weight of layers 1–7).
Layer 22: Adhesive (11% of total weight of layers 1–7).
Layer 23: 85% Nylon 6+15% amorphous nylon (9% of total weight of layers 1–7).
Layer 24: Adhesive (9% of total weight of layers 1–7).
Layer 25: 85% Nylon 6+15% amorphous nylon (9% of total weight of layers 1–7).
Layer 26: Adhesive (21% of total weight of layers 1–7).
Layer 27: Sealant (26% of total weight of layers 1–7).
The film had a total thickness of about 4 mils.

Table 1 shows a comparison of the amount of elongation in the machine direction and transverse direction for films having different thicknesses in a seven-layered structure. Table 2 shows a comparison of the amount of shrinkage in the machine direction and transverse direction for films having different thicknesses in a seven-layered structure.

TABLE 1

COMPARISON OF % ELONGATION FOR EXAMPLE 1

| | 3 mil Machine/Transverse | | 5 mil Machine/Transverse | | 10 mil Machine/Transverse | |
|---|---|---|---|---|---|---|
| | 386.8 | 484.4 | 519.6 | 575.0 | 643.6 | 612.9 |
| | 469.1 | 434.1 | 516.8 | 529.8 | 630.8 | 600.4 |
| | 412.1 | 459.3 | 513.4 | 579.2 | 615.2 | 599.2 |
| | 429.3 | 458.7 | 518.9 | 562.3 | 637.1 | 639.0 |
| | 406.1 | 427.1 | 484.0 | 551.8 | 605.1 | 590.2 |
| AVE | 420.7 | 452.7 | 510.5 | 559.6 | 626.4 | 608.3 |

TABLE 2

COMPARISON OF % SHRINKAGE FOR EXAMPLE 1

| Thickness | Machine Direction | Transverse Direction |
|---|---|---|
| 3 mil | 0.0% | 0.0% |
| 5 mil | 1.5% | 0.5% |
| 10 mil | 1.0% | 0.0% |

Various features of the invention are particularly shown and described in connection with the illustrated embodiments of the invention. However, it must be understood that the particular arrangements do not limit, but merely illustrates, and the invention is to be given its fullest interpretation within the terms of the appended claims.

What is claimed is:

1. A multilayered structure comprising:
   a) a first layer of polyester, wherein said polyester is selected from the group consisting of a homopolymer or copolymer of ethylene terephthalate, ethylene naphthalate and blends thereof;
   b) a second layer of an adhesive;
   c) a third layer comprising a nylon or nylon blend, wherein said third layer is a bend between about 100% (wt.) to about 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6.9 (poly (hexamethylene nonanediamide)), nylon 6,10 (poly (hexamethylene sebacamide)), nylon 6,12 (poly (hexamethylene dodecanediamide)), nylon 6/12 (poly (caprolactam-co- dodecanediamide)), nylon 6,6/6 (poly (hexamethylene adipamide-co-caprolactam)), nylon 11(polyundecanolactam), nylon 12 (polyauryllactam) and alloys or mixtures thereof; and between about 0% (wt.) to about 29% (wt.) of an amorphous nylon;
   said first layer, said second layer and said third layer are formed into a flexible film by a coextrusion process such that said first layer, said second layer and said third layer have a combined thickness of 10 mils or less; and wherein said film is nonoriented and has a heat shrinkage value of less than about 5% in the machine direction at 90° C. and less than about 5% in the transverse direction at 90° C.

2. A multilayered structure according to claim 1, wherein said film is produced by slot cast or single-bubble blown coextrusion.

3. A multilayered structure according to claim 1, wherein said first layer is an outer-surface layer of said film.

4. A multilayered structure according to claim 1, wherein said second layer is directly adhered to said first layer.

5. A multilayered structure according to claim 1, wherein said film has a thickness between about 3 mils to about 7 mils.

6. A multilayered structure according to claim 1 wherein said film has a heat shrinkage value less than about 2% in the machine direction at 90° C. and less than about 2% in the transverse direction at 90° C.

7. A multilayered structure according to claim 1, wherein said film contains less than 500 ppm of a transition-metal salt selected from the group consisting of manganese II, manganese III, iron II, iron III, cobalt II, cobalt m, nickel II, nickel III, copper I, copper II, rhodium II, rhodium III, rhodium IV, and ruthenium.

8. A multilayered structure according to claim 1, wherein said film has a gloss value greater than about 65 Hunter Units (HU).

9. A multilayered structure according to claim 1, wherein said film comprises processing additives.

10. A multilayered structure according to claim 1, wherein said adhesive is selected from the group consisting of a modified or unmodified homopolymer or copolymer of ethylene, alklyl acrylates, vinyl esters, ethylene-alpha olefins and blends thereof.

11. A multilayered structure according to claim 10, wherein said adhesive is selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olefins and blends thereof.

12. A multilayered structure according to claim 1, wherein at least one additional layer is adhered to said film by thermal lamination, adhesive lamination, coextrusion coating or coextrusion lamination.

13. A multilayered structure according to claim 1, further comprises a fourth layer of an oxygen barrier or an adhesive.

14. A multilayered structure according to claim 13, wherein said oxygen barrier is selected from the group consisting of ethylene vinyl alcohol copolymer, polyvinylidene chloride, polyvinylidene chloride copolymers, polyacrylonitrile, acrylonitrile copolymers, and blends thereof.

15. A multilayered structure according to claim 14, wherein said oxygen barrier has an oxygen transmission rate less than about 15.5 cc/m$^2$ for 24 hours at 1 atmosphere.

16. A multilayered structure according to claim 13, wherein said adhesive is selected from the group consisting of a modified or unmodified homopolymer of copolymer of ethylene, alkyl acrylates, vinyl esters, ethylene-alpha olefins and blends thereof.

17. A multilayered structure according to claim 16, wherein said adhesive is selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olefins and blends thereof.

18. A multilayered structure according to claim 13, further comprising a filth layer comprising a nylon or nylon blend.

19. A multilayered structure according to claim 18, wherein said fifth layer nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 polyauryllactam) and alloys or mixtures thereof.

20. A multilayered structure according to claim 19, wherein said fifth layer is a blend between about 100% (wt.) to 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (polyhexamethyene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11(polyundecanolactam), nylon 12 (polyauryllactam) and alloys or mixtures thereof; and between about 0% (wt.) to about 29% (wt.) of an amorphous nylon.

21. A multilayered structure according to claim 18, further comprising a sixth layer of an adhesive.

22. A multilayered structure according to claim 21, wherein said adhesive is selected from the group consisting of a modified or unmodified homopolymer of copolymer of ethylene, alkyl acrylates, vinyl esters, ethylene-alpha olefins and blends thereof.

23. A multilayered structure according to claim 22, wherein said adhesive is selected from the group consisting of a modified or unmodified homopolymer or copolymer of ethylene, methyl acrylated, ethyl acrylate, n-butyl acrylate, ethylene vinyl acetate, ethylene vinyl acetate copolymers, ethylene-alpha olefins and blends thereof.

24. A multilayered structure according to claim 21, further comprising a seventh layer of a sealant.

25. A multilayered structure according to claim 24, wherein said sealant is selected from a group consisting of an ionomer, heterogeneous ethylene alpha olefin copolymer, a homogeneous ethylene alpha olefin copolymer, ethylene vinyl acetate copolymer, ethylene methyl acrylate copolymer, ethylene propylene copolymer, polybutylene homopolymer or copolymer, and blends thereof.

26. A multilayered structure according to claim 1, wherein said first layer, said second layer and said third layer from a substrate of a larger multilayered-film being coextruded.

27. A multilayered structure according to claim 1, wherein said film has a percent elongation at breatk at room temperature greater than about 250 in the machine direction and greater than about 250 in the transverse direction.

28. A multilayered structure comprising:
  a) a first layer of polyester, wherein said polyester is selected from the group consisting of a homopolymer or copolymer of ethylene terephthalate, ethylene naphthalate and blends thereof;
  b) a second layer of an adhesive;
  c) a third layer comprising a nylon blend, wherein said third layer is a blend between about 100% (wt.) to about 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly (hexamethylene (nonanediamide)), nylon 6, 10 (poly (hexamethylene sebacamide)), nylon 6,12 (poly (hexamethylene dodecanediamide)), nylon 6/12 (poly (caprolactam-co- dodecanediamide)), nylon 6,6/6 (poly (hexamethylene adipamide-co-caprolactam)), nylon 11 (polyundecanolactam), nylon 12 (polyauryllactam) and alloys or mixtures thereof; and between about 0% (wt.) to about 29% (wt.) of an amorphous nylon; said first layer, said second layer and said third layer are formed into a flexible film by a coextrusion process wherein said film has a heat shrinkage value less than about 5% in the machine direction direction at 90° C. less than about 5% in the transverse direction at 90° C.; and said film has a percent elongation at break at room temperature greater than about 250 in the machine direction and greater than about 250 in the transverse direction.

29. A multilayered structure comprising:
a) a first layer selected from the group consisting of a homopolymer or corpolymer of ethylene terephthalate, ethylene naphthalate and blends thereof;
b) a second layer of an adhesive is selected from the group consisting of a modified or unmodified homopolymer or copolymer of ethylene, alkyl acrylates, vinly esters, ethylene-alpha olfefins and blends thereof;
c) a third layer is a nylon selected from the group consisting nylon 4,6 (poly(tetramethylene adipamide)), nylon 6 (polycaprolactam), nylon 6,6 (poly (hexamethylene adipamide)), nylon 6,9 (poly (hexamethylene nonandeiamide)), nylon 6,10 (poly (hexamethylene sebacamide)), nylon 6, 12 (poly (hexamethylene dodecanediamide)), nylon 6/12 (poly (caprolactam-co-dodecanediamide)), nylon 6,6/6 (polyhexamethylene adipamide-co-caprolactam)),, nylon 11 (polyundecanolactam), nylon 12 (polyauryllactam) and alloys or mixtures thereof; said first layer, said second layer and said third layer are formed into a flexibile film by a coextrusion process wherein said film is nonoriented; and wherein said film has a gloss value greater than about 65 Hunter Units (HU).

30. A multilayered structure according to claim 29, wherein said film is produced by slot cast or single-bubble blown coextrusion.

31. A multilayered structure according to claim 29, wherein said first layer is an outer-surface layer of said film.

32. A multilayered structure according to claim 29, wherein said second layer is directly adhered to said first layer.

33. A multilayered structure according to claim 29, wherein said film has a thickness less than about 16 mils.

34. A multilayered structure according to claim 33, wherein said film has a thickness less than about 10 mils.

35. A multilayered structure according to claim 34, wherein said film has a thickness between about 3 mils to about 7 mils.

36. A multilayered structure according to claim 29, wherein said film has a heat shrinkage value less than about 5% in the machine direction at 90° C. and less than about 5% in the transverse direction at 90° C.

37. A multilayered structure according to claim 36, wherein said film has a heat shrinkage value less than about 2% in the machine direction at 90° C. and less than about 2% in the transverse direction at 90° C.

38. A multilayered structure according to claim 29, wherein said film contains less than 500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

39. A multilayered structure according to claim 29, wherein said film comprises processing additives.

40. A multilayered structure according to calim 29, wherein at least one additional layer is adhered to said film by thermal lamination, adhesive lamination, coextrusion coating, or coextrusion lamination.

41. A multilayered structure according to claim 29, further comprises a fourth layer of an oxygen barrier or an adhesive.

42. A multilayered structure according to claim 41, wherein said oxygen barrier is selected from the group consisting of ethylene vinyl alcohol copolymer.

43. A multilayered structure according to claim 41, wherein said oxygen barrier has an oxygen trnasmission rate less than about 15.5 $cc/m^2$ for 24 hours at 1 atmosphere.

44. A multilayered structure according to claim 41, wherein said adhesive is selected from the group consisting of a modified or unmodified homopolymer of copolymer of ethylene, alkyl acrylates, vinyl esters, ethylene-alpha olfefins and blends thereof.

45. A multilayered structure according to claim 44, wherein adhesive is selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olefins and blends thereof.

46. A multilayered structure according to claim 29, further comprising a fifth layer comprising a nylon or nylon blend.

47. A multilayered structure according to claim 46, wherein said fifth layer is a nylon selected from the group consisting of nylon 4, 6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sabacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof.

48. A multilayered structure according to claim 47, wherein said fifth layer is a blend between about 100% (wt.) to abut 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof; and between about 0% (wt.) of an amorphous nylon.

49. A multilayered structure according to claim 41, further comprises a sixth layer of an adhesive.

50. A multilayered structure according to claim 49, wherein said adhesive is selected from the group consisting of a modified or unmodified homopolymer of copolymer of ethylene, alkyl acrylates, vinly esters, ethylene-alpha olefins and blends thereof.

51. A multilayered structure according to claim 50, wherein adhesive is selected from the group consisting of a modified or unmodified homopolymer or copolymer of ethylene, methyl acrylated, ethyl acrylate, n-butyl acrylate, ethylene vinyl acetate, ethylene vinyl acetate copolyers, ethylene-alpha olefins and blends thereof.

52. A multilayered structure according to claim 49, further comprises a seventh layer of a sealant.

53. A multilayered structure according to claim 52, wherein said sealant is selected from a group consisting of an ionomer, heterogeneous ethylene alpha olefin copolymer, a homogeneous ethylene alpha olefin copolymer, ethylene vinyl acetate copolymer, ethylene methyl acrylate copolymer, ethylene propylene copolymer, polybutylene homopolymer or copolymer, and blends thereof.

54. A multilayered structure according to claim 29, wherein said first layer, and second layer and said third layer form a substructure of a larger multilayered-film being coextruded.

55. A multilayered structure according to claim 29, wherein said film has a percent elongation at breat at room temperature greater than about 250 in the machine direction and greater than about 250 in the transverse direction.

56. A multilayered structure comprising:
 a) a first layer selected from the group consisting of a homopolymer or copolymer of ethylene terephthalate, ethylene naphthalate and blends thereof;
 b) a second layer of an adhesive selected from the group consisting of modified or unmodified homopolymer or copolymer of ethylene, alkyl acrylates, vinyl esters, ethylene-alpha olefins and blends thereof;
 c) a third layer is a nylon selected from the group consisting of nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof;
 said first layer, said second layer and said third layer are formed into a flexible film by a coextrusion process wherein said film has a heat shrinkage value less than about 5% in the machine direction 90° C. and less than about 5% in the transverse direction at 90° C.; and said film has a percent elongation at breat at room temperature greater than about 250 in the machine direction and greater than about 250 in the transverse direction.

57. A multilayered structure comprising:
 a) a first layer selected from the group consisting of homopolymer or copolymer of poly (ethylene terephthalate), poly (ethylene naphthalate) and blends thereof;
 b) a second layer of an adhesive selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olefins and blends thereof;
 c) a third layer of a blend between about 100 % (wt.) to abut 71 % (wt.) of a nylon selected from a group consisting of nylon 4,6 (poly(tetramethylene adipamide)), nylon 6 (polycaprolactam), nylon 6,6 (poly(hexamethylene adipamide)), nylon 6,9 (poly (hexamethylene nonanediamide)), nylon 6,10 (poly (hexamethylene sebacamide)), nylon 6,12 (poly (hexamethylene dodecanediamide)), nylon 6/12 (poly (caprolactam-co- dodecanediamide)), nylon 6,6/6 (poly (hexamethylene adipamide-co-caprolactam)), nylon 11(polyundecanolactam), nylon 12 (polyauryllactam) and alloys or mixtures thereof; and between about 0 % (wt.) to about 29 % (wt.) of an amorphous nylon; and said first layer, said second layer and said third layer are formed into a flexible film by a coextrusion process wherein said film is nonoriented.

58. A multilayered structure according to claim 57, wherein said multilayered film is produced by slot cast or single-bubble blown coextrusion.

59. A multilayered structure according to claim 57, wherein said first layer is an outer-surface layer of said film.

60. A multilayered structure according to claim 57, wherein said second layer is directly adhered to said first layer.

61. A multilayered structure according to claim 57, wherein said film has a thickness less than about 16 mils.

62. A multilayered structure according to claim 61, whereinn said film has a thickness less than about 10 mils.

63. A multilayered structure according to claim 62, wheren said film has a thickness between about 3 mils to 7 mils.

64. A multilayered structure according to claim 57, wherein said film has a heat shrinkage values less than about 2% in the machine direction at 90° C. and less than 2% in the transverse direction at 90° C.

65. A multilayered structure according to claim 64, wherein said film has a heat shrinkage value less than about 2% in the machine direction at 90° C. and less than about 2% in the transverse direction at 90° C.

66. A multilayered structure according to claim 57, wherein said film contains less than 500 ppm of a transition-metal salt selected from the group consisting of manganese II, manganese III, iron II, iron III, cobalt II, cobalt III, nickel II, nickel III, copper I, copper II, rhodium II, rhodium III, rhodium IV, and ruthenium.

67. A multilayered structure according to claim 57, wherein said film has a gloss value greater than about 65 Hunter Units (HU).

68. A multilayered structure according to claim 57, wherein said film comprises processing additives.

69. A multilayered structure accordint to claim 57, wherein at least one additional layer is adhered to said film by thermal lamination, adhesive lamination, coextrusion coating, or coextrusion lamination.

70. A multilayered structure according to claim 57, further comprises a fourth layer of an oxygen barrier or an adhesive.

71. A multilayered structure according to claim 70, wherein said oxygen barrier is selected from the group consisting of ethylene vinyl alcohol polymer, polyvinylidene chloride, polyvinylidene chloride copolymers, polyacrylonitrile, acrylonitrile copolymers, and blends thereof.

72. A multilayered structure according to claim 70, wherein said oxygen barrier has an oxygen transmission rate less than about 15.5 cc/m2 hours at 1 atmosphere.

73. A multilayered structure according to claim 70, wherein said adhesive is selected from the group consisting of a modified or unmodified homopolymer of copolymer of ethylene, alkyl acrylates, vinly esters, ethylene-alpha olefins and blends thereof.

74. A multilayered structure according to claim 73, wherein adhesive is selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olefins and blends thereof.

75. A multilayered structure according to claim 70, further comprising a fifth layer comprising a nylon or nylon blend.

76. A multilayered structure according to claim 75, wherein said fifth layer is nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof.

77. A multilayered structure according to claim 76, wherein said fifth layer is a blend between about 100% (wt.) to abut 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polyauryllactam) and alloys or mixtures thereof; and between about 0% (wt.) to about 29% (wt.) of an amorphous nylon.

78. A multilayered structure according to claim 75, further comprises a sixth layer of an adhesive.

79. A multilayered structure according to claim 78, wherein said adhesive is selected from the group consisting of a modified or unmodified homopolymer of copolymer of ethylene, alkyl acrylates, vinyl esters, ethylene-alpha olefins and blends thereof.

80. A multilayered structure according to claim 79, wherein adhesive is selected from the group consisting of a modified or unmodified homopolymer or copolymer of ethylene, methyl acrylate, ethyl acrylate, n-butyl acrylate, ethylene vinyl acetate, ethylene vinyl acetate copolymers, ethylene-alpha olfefins and blends thereof.

81. A multilayered structure according to claim 78, further comprises a seventh layer of a sealant.

82. A multilayered structure according to claim 81, wherein said sealant is selected from a group consisting of an ionomer, heterogeneous ethylene alpha olfefin copolymer, a homogeneous ethylene alpha olefin copolymer, ethylene vinyl acetate copolymer ethylene methyl acrylate copolymer, ethylene propylene copolymer, polybutylene homopolymer or copolymer, and blends thereof.

83. A multilayered structure according to claim 57, wherein said first layer, and second layer and said third layer form a substructure of a larger multilayered-film being coextruded.

84. A multilayered structure according to claim 57, wherein said film has a percent elongation at breat at room temperature greater than about 250 in the machine direction and greater than about 250 in the transverse direction.

85. A multilayered structure comprising:
  a) a first selected from the group consisting of homopolymer and copolymer of poly (ethylene terephthalate), poly (ethylene naphthalate) and blends thereof;
  b) a second layer of an adhesive selected from the group consisting of a modified or unmodified homopolymer or copolymer of ethylene, methyl acrylate, ethyl acrylate, n- butyl acrylate, ethylene vinyl acetate, ethylene vinyl acetate copolymers, ethylene-alpha olefins and blends thereof;
  c) a third layer of a blend between about 100% (wt.) to about 71(wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly (hexamethylene nonanediamide)), nylon 6,10 (poly (hexamethylene sebacamide)), nylon 6,12 (poly (hexamethylen dodecanediamide)), nylon 6/12 (poly (caprlactam-co- dodecanedimaide)), nylon 6,6/6 (poly (hexamethylene adipamide-co-caprolactam)), nylon 11 (polyundecanolactam), nylon 12 (polyauryylactam) and alloys or mixtures thereof; and between about 0% (wt.) to about 29% (wt.) of an amorphous nylon; said first layer, said second layer and third layer are formed into a flexible film by a coextrusion process wherein said film has a heat shrinkage value less than about 5% in the machine direction at 90° C. and less than about 5% in the transverse direction at 9020 C.; and said film has a percent elongation at breat at room temperature greater than about 250 in the machine direction and greater than about 250 in the transverse direction.

* * * * *

UNITED STATES PATENT AND TRADEMARK OFFICE
CERTIFICATE OF CORRECTION

PATENT NO. : 6,964,816 B2
APPLICATION NO. : 10/237949
DATED : November 15, 2005
INVENTOR(S) : Thomas Andrew Schell, Gregory Robert Pockat and Andrew John Lischefski It is certified that error appears in the above-identified patent and that said Letters Patent is hereby corrected as shown below:

In column 10, line 50, please change "a bend between" to --a blend between--;
In column 12, line 53, please change "at breatk at" to --at break at--;
In column 13, line 34, please change "caprolactam)),," to --caprolactam)),--;
In column 14, line 14, please change "copolymer." to --copolymer, polyvinylidene chloride, polyvinylidene chloride copolymers, polyacrylonitrile, acrylonitrile copolymer, and blends thereof.--
In column 14, line 16, please change "oxygen transmission" to --oxygen transmission--;
In column 14, line 55, please change "0% (wt.)" to --0% (wt.) to about 29% (wt.)--;
In column 14, line 67, please change "methyl acrylated" to --methyl acrylate--;
In column 15, line 1, please change "copolyers" to --copolymers--;
In column 15, line 13, please change "and second layer" to --said second layer--;
In column 15, line 17, please change "breat" to --break--;
In column 15, line 29, please change "consisting of nylon 6,6" to --consisting of nylon 4,6 (poly(tetramethylene adipamide)), nylon 6 (polycaprolactam), nylon 6,6--;
In column 15, line 42, please change "direction" to --direction at--;
In column 15, line 44, please change "breat" to --break--;
In column 16, line 23, please change "less than" to --less than about--;
In column 16, line 40, please change "accordint" to --according--;
In column 16, line 54, please change "15.5 cc/m2 hours" to --15cc/m$^2$ for 24 hours--;
In column 16, line 58, please change "vinly" to --vinyl--;
In column 18, line 5, please change "and second layer" to --said second layer--;
In column 18, line 9, please change "breat" to --break--;
In column 18, line 13, please change "a first selected" to --a first layer selected--;
In column 18, line 14, please change "and copolymer" to --or copolymer--;
In column 18, line 24, please change "71(wt.)" to --71% (wt.)--;
In column 18, line 30, please change "hexamethylen" to --hexamethylene--;
In column 18, line 31, please change "capriactam-co- dodecanedimaide" to --caprolactam-co-dodecanediamide--;

UNITED STATES PATENT AND TRADEMARK OFFICE
CERTIFICATE OF CORRECTION

PATENT NO. : 6,964,816 B2
APPLICATION NO. : 10/237949
DATED : November 15, 2005
INVENTOR(S) : Thomas Andrew Schell, Gregory Robert Pockat and Andrew John Lischefski It is certified that error appears in the above-identified patent and that said Letters Patent is hereby corrected as shown below:

In column 18, line 33, please change "polyauryylactam" to --polyauryllactam--;
In column 18, line 36, please change "and third layer" to --said third layer--;
In column 18, line 40, please change "9020 C." to --90° C.--; and
In column 18, line 41, please change "breat" to --break--.

Signed and Sealed this

Fourteenth Day of November, 2006

JON W. DUDAS
*Director of the United States Patent and Trademark Office*